United States Patent [19]
Fukino

[11] Patent Number: 5,898,528
[45] Date of Patent: Apr. 27, 1999

[54] LENS BARREL WITH BUILT-IN ULTRASONIC MOTOR

[75] Inventor: Kunihiro Fukino, Fujisawa, Japan

[73] Assignee: Nikon Corporation, Tokyo, Japan

[21] Appl. No.: 08/833,202

[22] Filed: Apr. 14, 1997

[30] Foreign Application Priority Data

Apr. 19, 1996 [JP] Japan ..................................... 8-098191

[51] Int. Cl.$^6$ .................................................. G02B 7/02
[52] U.S. Cl. .......................... 359/823; 359/696; 359/699; 359/824; 396/133
[58] Field of Search .................................... 359/808, 823, 359/824, 694, 695, 696, 699, 700; 396/133, 137

[56] References Cited

U.S. PATENT DOCUMENTS

| | | | |
|---|---|---|---|
| 5,335,115 | 8/1994 | Kawai et al. | 359/696 |
| 5,418,650 | 5/1995 | Imanari et al. | 359/823 |
| 5,453,807 | 9/1995 | Iizuka | 359/823 |
| 5,546,233 | 8/1996 | Imanari et al. | 359/696 |
| 5,663,842 | 9/1997 | Takayama et al. | 359/823 |

FOREIGN PATENT DOCUMENTS 4-343310 11/1992 Japan .
8-114739 5/1996 Japan .

*Primary Examiner*—Loha Ben
*Attorney, Agent, or Firm*—Morgan, Lewis, Bockius LLP

[57] ABSTRACT

Lens barrel with built-in ultrasonic motor, comprises photographing optical system having lens movable in the direction of the optical axis, fixed barrel supporting the optical system, manual operation member held on the fixed barrel and rotatable by external operation, ultrasonic motor including stationary member which is provided on fixed barrel and is rotatable about the optical axis and which can generate ultrasonic wave and rotor which is in frictional contact with stationary member and rotatable about the optical axis, and mode selection member by which is selectable automatic focus adjusting mode and manual focus adjustment mode. When automatic focus adjustment mode is selected stationary member is fixed to fixed barrel and rotor is rotated by ultrasonic wave generated by stationary member, and when manual focus adjustment mode is selected stationary member is released so that rotor and stationary member are united as one body to rotate together in coordination with manual operation of manual operation member.

7 Claims, 5 Drawing Sheets

LENS BARREL WITH BUILT-IN ULTRASONIC MOTOR

BACKGROUND OF THE INVENTION

1. Field of the Invention

The present invention relates to a lens barrel for a camera having a built-in ultrasonic motor that drives a photographing or shooting lens.

2. Related Background Art

A lens barrel having a built-in ultrasonic motor in which a stationary member as a vibration generating member of the ultrasonic motor and a manual operation member are connected so that the stationary member and the manual operation member rotate with respect to a fixed portion of the lens barrel, and in which the lens operating mode is selected by actuating an electrical switch, is known.

In such a lens barrel, when a manual focus adjustment mode is selected using a mode selection member, i.e., by actuating the electrical switch, a relative moving member or rotor and the stationary member of the ultrasonic motor become united and rotate as a single body in conjunction with the manual operation member (e.g., a manual operation ring that is rotated by a photographer) to drive a photographing optical system.

When an automatic focus adjustment mode is selected, the stationary member is fixed and does not rotate with respect to the fixed barrel. The stationary member of the ultrasonic motor vibrates to impart rotational movement to other components of the lens barrel, and the photographing optical system is driven by rotation of the moving member caused by vibration of the stationary member.

Consequently, when the manual focus adjustment mode is selected, the photographing optical system can be driven without damaging the surfaces of the stationary member and the relative moving member of the ultrasonic motor that contact each other.

FIG. 3 is a cross-sectional view that illustrates a conventional lens barrel 2 having a built-in ultrasonic motor (see, e.g., Laid-Open Japanese Patent Application No. Hei 4-343310).

FIG. 4 is a cross-sectional view that illustrates a power supplying section of the lens barrel shown in FIG. 3. FIG. 5 is a schematic block diagram that illustrates a power supply circuit of the lens barrel of the prior art.

FIG. 3 illustrates the lens barrel in the automatic focus adjustment state in which a focus adjustment optical system L2 and L3 is driven by the rotation of an ultrasonic motor Mo (FIG. 4), and a mode selection switch 20 is set to the automatic focus adjustment mode.

The focus adjustment optical system L2 and L3 is supported by a lens holding barrel 2 and effects focus adjustment by moving in the direction of the optical axis. The lens holding barrel 2 is fitted movably in the direction of the optical axis in an inner periphery of a center intermediate diameter portion 1a of a fixed barrel 1. A pin 3 is provided on the outer periphery of the lens holding barrel 2. The pin 3 protrudes through a guide groove provided in the center intermediate diameter portion 1a in parallel with the optical axis. The tip of the pin 3 engages a cam groove 4a provided on the inner peripheral surface of a cam ring 4. The cam grooves 4a is so formed to move the lens holding barrel 2 in the direction of the optical axis by engagement of the cam groove 4a with the pin 3 when the cam ring 4 is rotated in the manner described hereinafter.

A pin 5 protrudes from the outer periphery of the center intermediate diameter portion 1a of the fixed barrel 1 to engage a circumferential groove 4b provided on the inner peripheral surface of the cam ring 4. Consequently, the cam ring 4 cannot move in the direction of the optical axis and thus can only rotate by a predetermined angle about the optical axis. The cam ring 4 also includes a distance scale that is displayed on the right side large diameter outer peripheral portion 4c of the cam ring 4.

A stator or stationary ring member 6 of the ultrasonic motor Mo is fitted on the outer periphery of a center small diameter portion 1c of the fixed barrel 1 to rotate freely about the optical axis.

A biasing member 11 is provided between the center small diameter portion 1c of the fixed barrel 1 and the stator 6 and urges the stator 6 to an inner side surface of the large diameter portion 1d of the fixed barrel 1 through a glass epoxy plate 15, thereby imparting a predetermined friction torque so that the stator 6 may not rotate easily when the automatic focus control mode is selected.

A window member 8, which is formed of a transparent synthetic resin, is disposed on the large diameter unit 1d of the fixed barrel 1. The window member 8 displays the distance scale on the outer periphery 4c through an intermediate ring 7. The intermediate ring 7, which is preferably formed of transparent synthetic resin, is fitted on the inner surface of a manual operation ring 10 rotatably therewith.

A rotor or rotating member 9 (i.e., the relative moving member of the ultrasonic motor Mo) is so disposed to frictionally contact the stator or stationary member 6 at their radially extended surfaces each other and to be rotatable about the optical axis through a bearing 12a relation to the stationary member 6. In particular, a biasing member 14 causes the stationary member 6 and the rotating member 9 to contact at their radially extended surfaces each other via an annular plate 13 and a bearing 12b. An engagement groove 9a is provided on the left side of the rotating member 9 to engage an engagement protrusion 4d on the right side of the inner periphery of the large diameter portion of the cam ring 4. Consequently, the rotating member 9 and the cam ring 4 rotate together.

The manual operation ring 10 is fitted on both the large diameter portion 1d of the fixed barrel 1 and the left side large diameter portion 1e. The manual operation ring 10 cannot move in the direction of the optical axis, but it can rotate freely about the optical axis.

A glass epoxy plate 15 is fixed to the stationary member 6 and includes ring-shaped conductive portions 15a that extend around the entire circumference, as shown in FIG. 4. The glass epoxy plate 15 is formed with through-holes 15b at positions offset from the ring-shaped portion through which the conductive portions 15a form an electrical connection with the stationary member 6 at the rear surface of the glass epoxy plate 15. A brush 16 contacts the top surface of the conductive portions 15a, establishing an electrical connection with the stationary member 6 regardless of its angular position.

A pressure plate 17 urges the brush 16 toward a fixed brush plate 18 to fix the brush thereonto. The fixed brush plate 18 is attached to the fixed barrel 1 by small screws 19.

The mode selection switch 20 slides in the direction of the optical axis on the fixed barrel between the manual focus adjustment mode position M and the automatic adjustment mode position A. The mode selection switch is configured to generate an electrical signal in accordance with either mode when the switch is activated.

A switching plate 21 is attached to the mode selection switch 20 by a small screw 23. A plate spring 22 is attached to the fixed barrel 1 by a small screw 24. The plate spring 22 is disposed to cooperate with a plurality of engagement grooves 6a that are provided on the outer periphery of the stationary member 6.

When the mode selection switch 20 is slid to the M position, i.e., when the manual focus adjustment mode is selected, the switching plate 21 moves simultaneously, thereby pushing up the plate spring 22 radially outwardly as indicated by the dotted line in FIG. 3. As a result, the plate spring 22 is withdrawn from the engagement grooves 6a. When the engagement grooves 6a of the stationary member 6 are separated from the plate spring 22, the manual operation ring 10 can be rotated.

When the mode selection switch 20 is slid to the A position, i.e., when the automatic focus adjustment mode is selected, the switching plate 21 is moved simultaneously, thereby allowing the plate spring 22 to return to its initial position as indicated by the solid line in FIG. 3. As a result, the plate spring 22 engages the engagement grooves 6a of the stationary member 6, and the manual operation ring 10 stops rotating.

The lens barrel is designed to satisfy a condition C<B<A, where A is friction torque between the stationary member 6 and the rotating member 9, B is friction torque between the fixed barrel 1 and the stationary member 6, and C is torque necessary to drive the lens holding barrel 2.

<Automatic Focus Adjustment Mode>

In operation, when the automatic focus adjustment mode is selected, the engagement grooves 6a of the stationary member 6 are engaged with the plate spring 22. Consequently, the manual operation ring 10 and the stationary member 6 stop rotating.

When a power source is connected to the ultrasonic motor Mo by a control mechanism (e.g., such as a power source unit 100 as shown in FIG. 4), ultrasonic waves are generated in the stationary member 6, and the rotating member 9 rotates in the circumferential direction. When the rotating member 9 rotates, the rotating member 9 and the cam ring 4 rotate together because the engagement groove 9a on the right side of the rotating member 9 engages the engagement protrusion 4d on the cam ring 4. When the cam ring 4 rotates, the lens holding barrel 2 moves along the optical axis so that automatic focus adjustment is conducted.

<Manual Focus Adjustment Mode>

In the manual focus adjustment mode, the mode selection switch 20 is in the position M, and power is not supplied to the ultrasonic motor Mo. When the mode selection switch 20 is slid to the M position, the plate spring 22 is depressed radially outwardly and becomes separated from the engagement grooves 6a. When the engagement grooves 6a and the plate spring 22 are separated from each other, the manual operation ring 10 can rotate. Power is not supplied to the ultrasonic motor Mo in this case, so the ultrasonic motor Mo does not drive the lens barrel. The stationary member 6 and the rotating member 9 are firmly pressed together by the biasing member 14.

Because the friction torque A between the stationary member 6 and the rotating member 9 and the torque C necessary for driving the lens holding barrel 2 satisfy the condition C<A, the stationary member 6 and the rotating member 9 rotate together with the intermediate ring 7 when the manual operation ring 10 rotates.

The rotating member 9 and the cam ring 4 rotate together because the engagement groove 9a on the left side of the rotating member 9 and the engagement protrusion 4d of the cam ring 4 are engaged. When the cam ring 4 rotates, the lens holding barrel 2 is moved in the direction of the optical axis, and manual focus adjustment is conducted.

As described above, when the automatic focus adjustment mode is selected, the mode selection switch is in the A position, and the engagement grooves 6a are engaged with the plate spring 22, whereby the manual operation ring 10 and the stationary member 6 stop rotating.

The friction torque B between the fixed barrel 1 and the stationary member 6 and the torque C necessary for driving the lens holding barrel 2 satisfy the condition C<B, even when the engagement grooves 6a and the plate spring 22 are not engaged . Therefore, when there is no engagement between the grooves 6a and the plate spring 22, only the rotating member 9 rotates (i.e., the stationary member 6 does not rotate). In other words, which focus adjustment mode has been selected can be ascertained by determining whether power is supplied to the ultrasonic motor Mo.

Accordingly, it becomes very easy to adopt a mechanism for effecting speedy change-over of such functions or modes as "go-home" photographing function in which an arbitrary photographing distance has been previously stored in memory and after a photographing is effected at a different photographing distance the lens is driven to the stored photographing distance, as well as a manual focus adjustment mode priority function in which, during phototaking in the automatic focus adjustment mode, the manual operation ring is rotated to thereby change over to the manual focus adjustment mode, since mechanical change-over becomes unnecessary.

The output torque from the moving member and the number of rotations in the ultrasonic motor described above are determined primarily according the size and shape of the motor. In other words, when the torque required to move the photographing optical system is determined, the number of rotations is known. Accordingly, when the time necessary for the photographing optical system to move from a photographing distance of infinity ($\infty$) to a close position is determined the corresponding angle through which the moving member must be rotated is also known.

With the conventional lens barrel described above, however, when the manual focus adjustment mode has been selected, the rotor or moving member (i.e., the relative moving member ) and the stationary member or stator of the ultrasonic motor rotate together to drive the photographing optical system by the rotation of these components in conjunction with the manual operation of the manual operation member. Consequently, the angle necessary for rotating the manual operation member from a photographing distance of infinity ($\infty$) to a close position is determined. A problem arises, however, when the angle is too small to allow manual focus adjustment.

The applicant has proposed a lens barrel with a built-in ultrasonic motor which overcomes the abovementioned problem in Laid-Open Japanese Patent Application No. 8-114739 (which corresponds to U.S. patent application Ser. No. 08/539,434 now U.S. Pat. No. 5,708,872).

FIG. 6 is a cross-section showing an embodiment of the lens barrel with the built-in ultrasonic motor proposed in JP8-114739.

In this embodiment, there are provided a plurality of rollers 25 each supported on a rotary shaft 26 whose center line is perpendicular to the optical axis and which in turn is provided on the outer periphery of the stationary member 6. Each roller 25 is in frictional contact with the fixed barrel 1 and the intermediate ring 7. Accordingly, if the manual operation ring 10 is rotated, the stationary member 6 is rotated about the optical axis on the outer periphery of the center small diameter portion 1c of the fixed barrel 1 through the intermediate ring 7 and the rollers 35.

The angle of rotation of the stationary member 6 at this time is a half of the angle of rotation of the manual operation ring 10 according to the principle of a planetary gear device.

This means that an angle required for rotating the manual operation ring from an infinite (∞) photographing distance to a close distance becomes larger than the angle of rotation of the rotor or moving member of the ultrasonic motor, thereby fine manual adjustment becoming possible.

As described, the lens barrel with the built-in ultrasonic motor proposed in JP8-114739 can overcome effectively the problem of the prior art.

In the proposed lens barrel, however, the ratio of the angle of rotation between the manual operation member and the stationary member is fixed to 2:1.

However, with respect to the angle of rotation of the manual operation member from an infinite (∞) photographing distance to a close photographing distance, a range in which good focusing operability can be obtained, depends on the specification of the lens barrel, such as, on the focusing length, close distance value and the like.

For this reason, the proposal made in JP8-114739 can not provide a lens barrel having good operability on manual focusing adjustment for all the specifications.

SUMMARY OF THE INVENTION

The present invention has for its object to provide a lens barrel with a built-in ultrasonic motor having superior in the operability on manual focus adjustment, independent from the angle of rotation of a moving member of an ultrasonic motor and from the specification of the lens barrel.

For attaining such an object, the present invention provides a lens barrel with a built-in ultrasonic motor, which comprises a photographing optical system, a fixed lens barrel, a stationary member which is fitted on said fixed barrel rotatably about the optical axis and which can generate ultrasonic wave, a movable member which is in friction contact with the stationary member to drive said photographing optical system, the stationary member and the movable member forming the ultrasonic motor, a manual operating member externally operable to drive said photographing optical system and a mode selection member by which an automatic focus control mode in which said photographing optical system is driven by said ultrasonic motor and a manual focus control mode in which said photographing optical system is driven by said manual operation member are selectable; and when the manual operation mode is selected by said mode selection member the movable member and the stationary member of said ultrasonic motor being united to rotate as a single body in coordination with manual operation of said manual operation member, and when the automatic focus control mode is selected, the stationary member of said ultrasonic motor is fixed to said fixed barrel and said photographing optical system is driven by rotation of said movable member, being characterized in the provision of a rotation angle conversion device which is capable of transmitting the angle of rotation of said manual operation member to the stationary member at an arbitrary ratio.

The above and other objects, features and advantages of the present invention will become more apparent upon a consideration of the following description of the preferred embodiment of the present invention taken in conjunction with the accompanying drawings.

DETAILED DESCRIPTION OF PREFERRED EMBODIMENTS

One embodiment of the present invention is described below with reference to the accompanying drawings.

Figure 1:
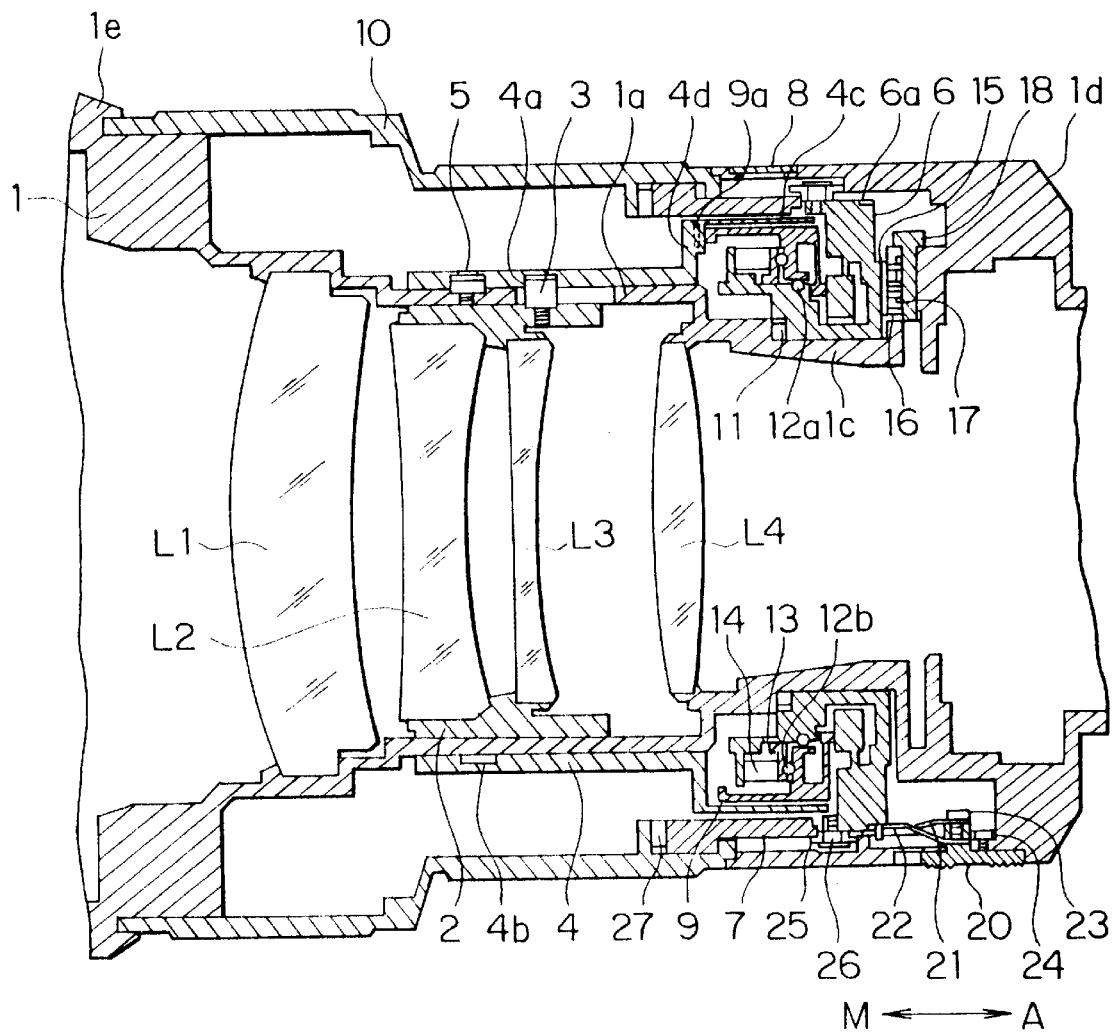
FIG. 1 is a cross-sectional view that illustrates an embodiment of the lens barrel with a built-in ultrasonic motor according to the present invention.
Figure 2:
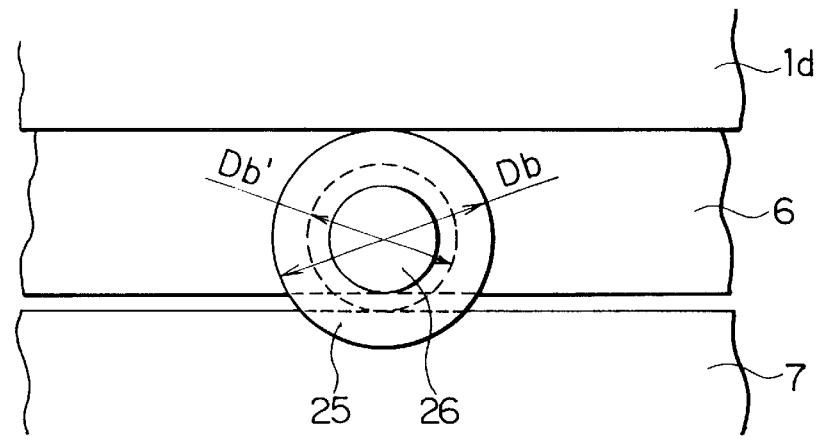
FIG. 2 is a partial side view of components inclusive of a roller 25 and a shaft 26 in the lens barrel with the built-in ultrasonic motor shown in FIG. 1.
Figure 4:
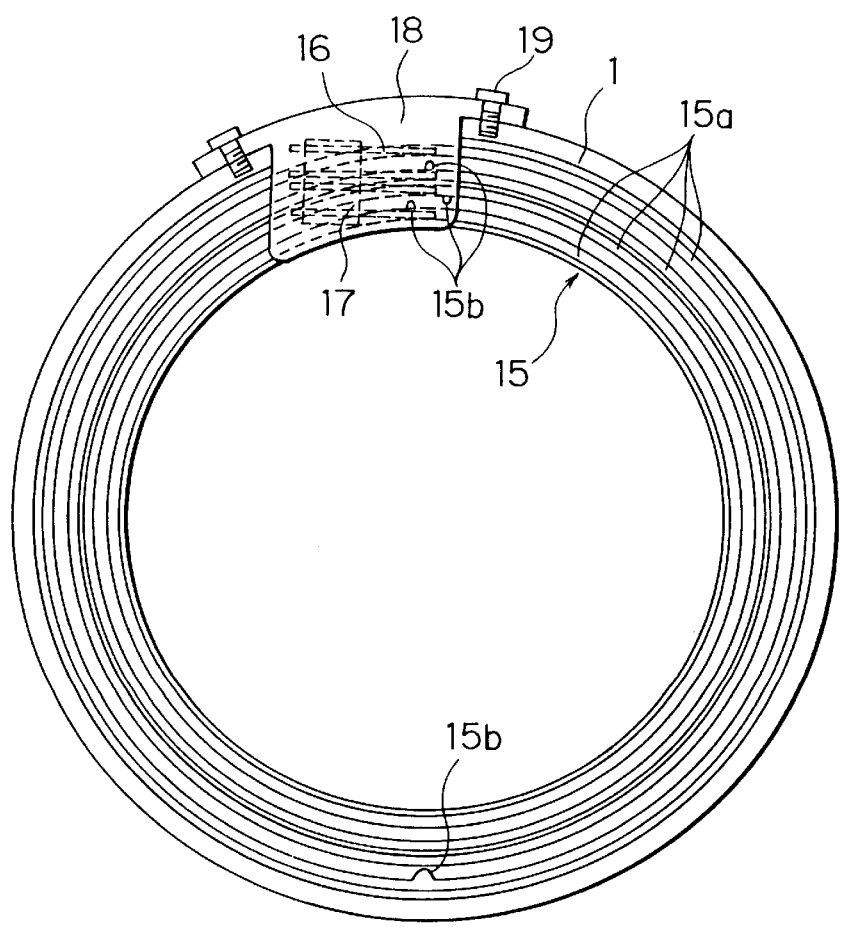
FIG. 4 is a cross-sectional side view that illustrates a power supplying portion.
Figure 3:
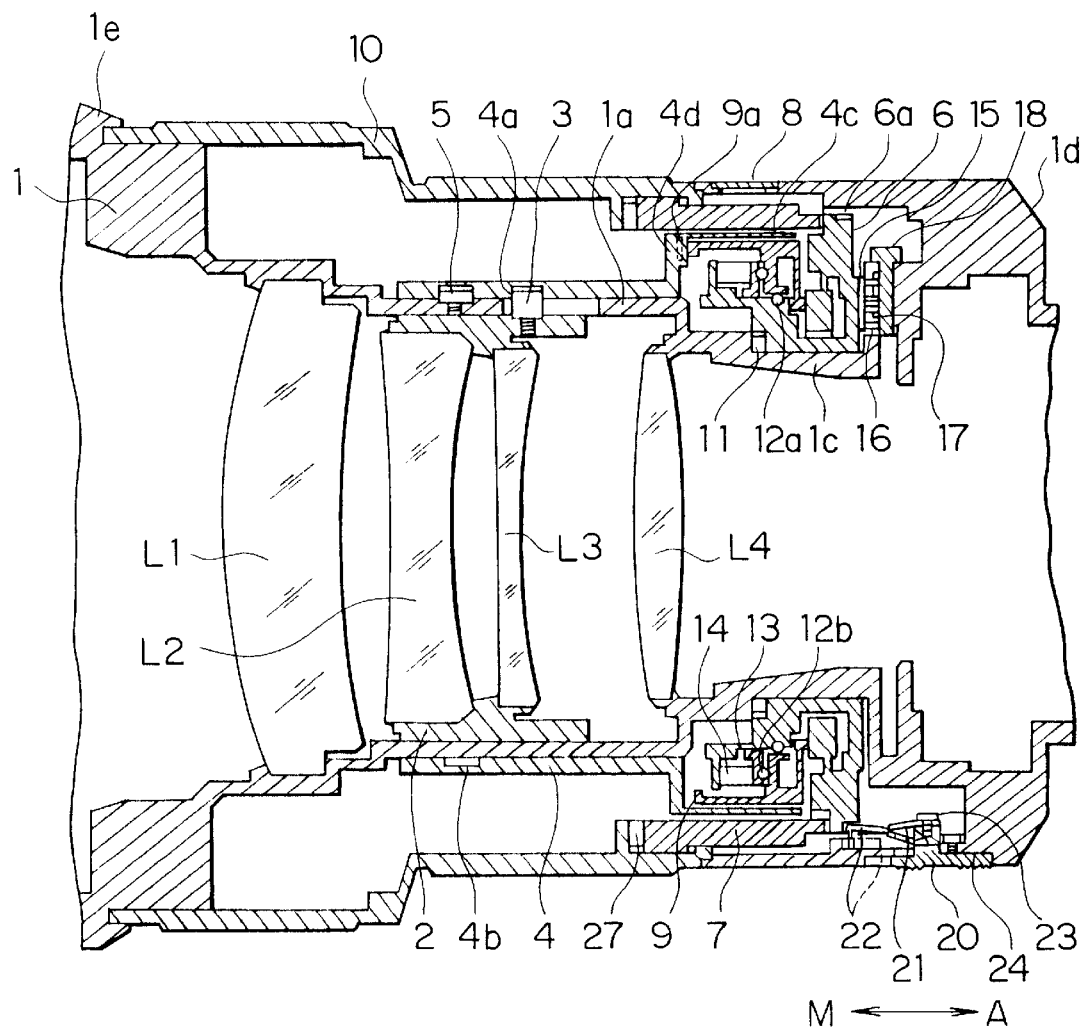
FIG. 3 is a cross-sectional view that illustrates a conventional lens barrel with a built-in ultrasonic motor.
Figure 5:
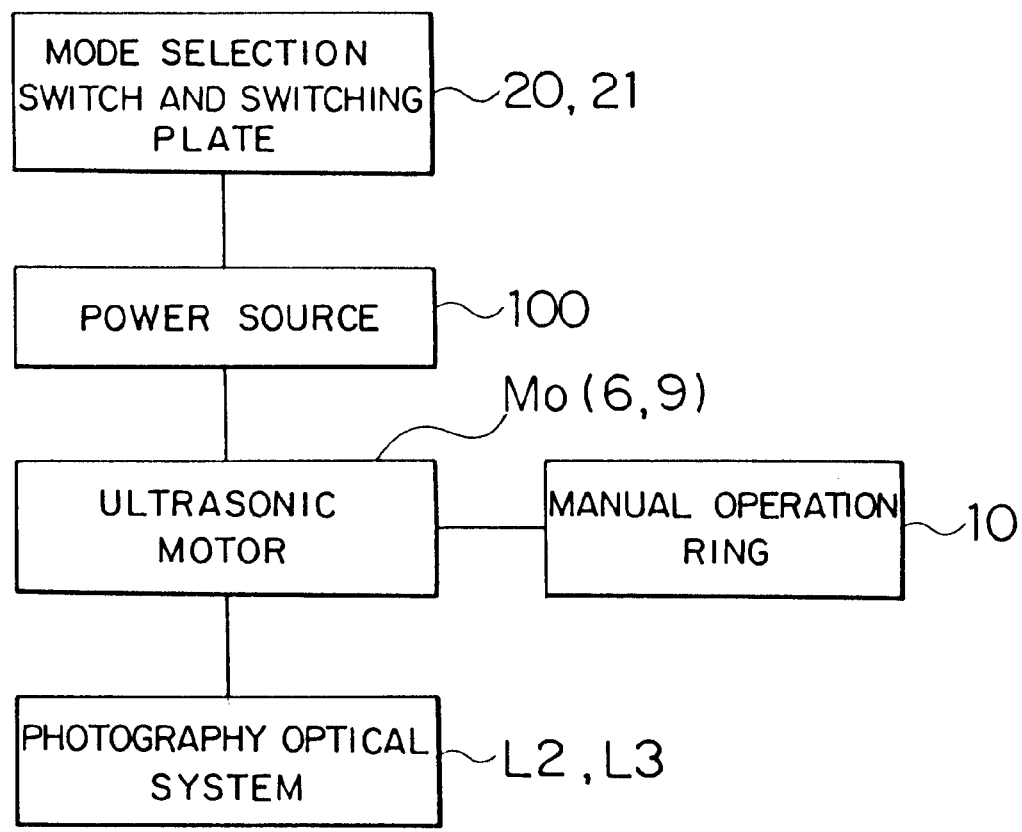
FIG. 5 is a schematic block diagram that illustrates the conventional lens barrel.
Figure 6:
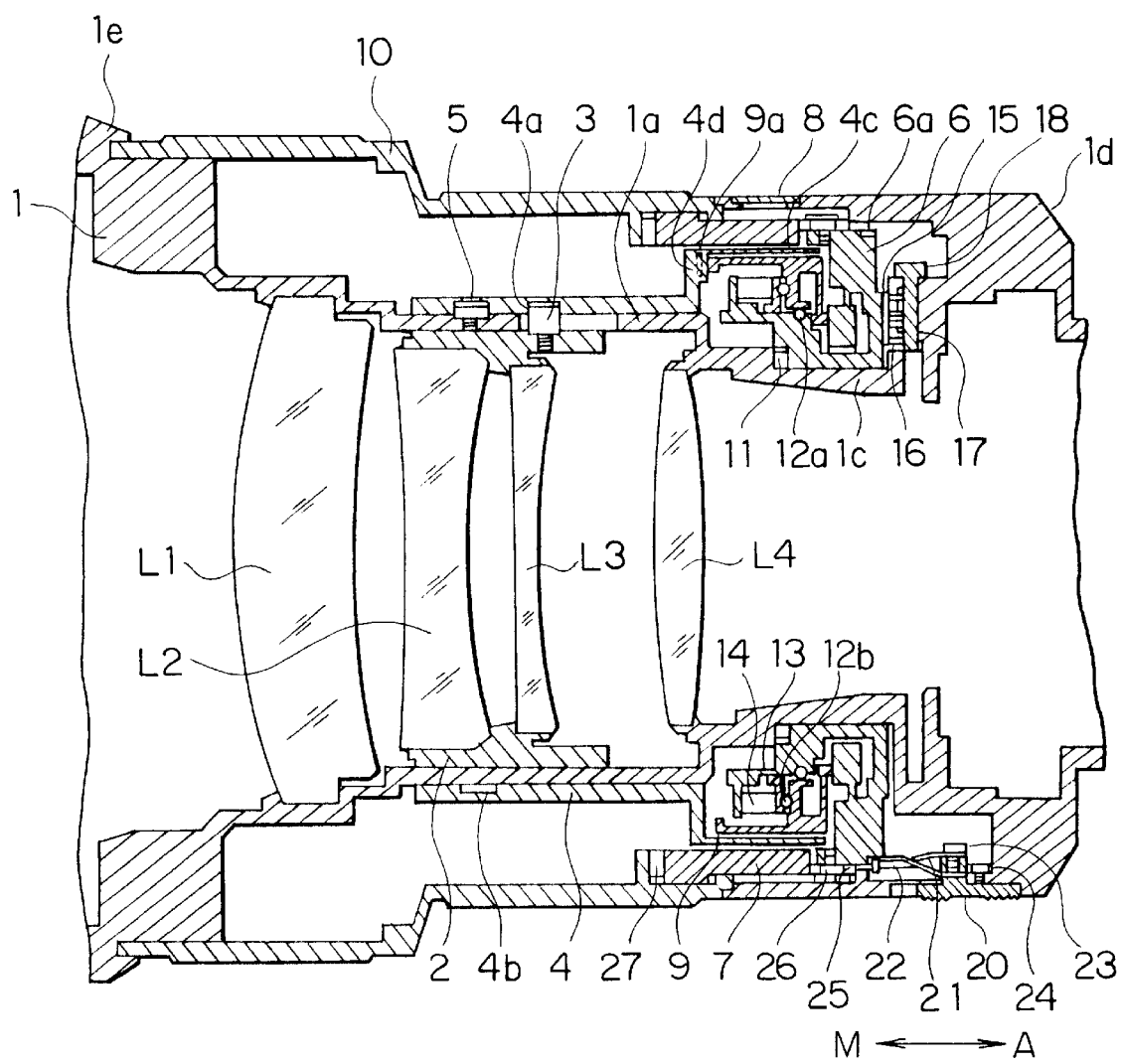
FIG. 6 is a cross-sectional view which illustrates a lens barrel with a built-in ultrasonic motor according to the JP8-114739.

FIG. 1 is a cross-sectional view that illustrates an embodiment of a lens barrel with a built-in ultrasonic motor according to the present invention. The elements of the lens barrel of the present invention that operate similar to the same elements of the lens barrel described above are designated with the same reference numerals or symbols. An additional or duplicated explanation of the commonly designated elements is omitted.

In this embodiment, a plurality of rollers 25 rotatably supported on shafts 26 whose center lines are perpendicular to the optical axis, and which are disposed on the outer peripheral portion of the stationary member 6. The internal ring of each roller 25 is preferably made of metal, and an outer covering of the roller 25 is preferably made of rubber. The outer periphery of each roller 25 has two portions, a large diameter portion and a small diameter portion, whose diameters Db and Db' are different to have the relation Db>Db'. Thus, each roller 25 has two diameters differing in the direction of the rotation axis to form a stepped outer periphery.

A biasing member 11 is disposed between the center small diameter portion 1c of the fixed barrel 1 and the stationary member 6, and the stationary member 6 is pressed or against the inner side surface of the large diameter portion 1d of the fixed barrel 1 by the rollers 25. In the illustrated embodiment, the large diameter portion of each roller is in contact with the inner side surface 1d of the fixed barrel 1 and the large diameter portion of each roller is in contact with the peripheral surface of the intermediate ring 7. Although not illustrated the large diameter portion of each roller may be in contact with the fixed barrel 6 and the small diameter portion of each roller may be in contact with the intermediate ring 7. As a result, a predetermined frictional torque is applied so that the stationary member 6 does not rotate easily when the automatic focus adjustment mode is selected.

In addition, a biasing member 27 is disposed between a manual operation ring 10 and an intermediate ring 7, and the intermediate ring 7 is pressed against the inner periphery of the large diameter unit 1d of the stationary barrel 1 through the rollers 25 such that these three components frictionally contact each other.

The rollers 25, each is in contact with a side surface of the intermediate ring 7 at a portion of the roller 25 whose diameter is Db', that is, at a small diameter portion of the roller 25. Each roller 25 is in contact with the side surface of the large diameter portion 1d of the fixed lens barrel at a large diameter portion whose diameter is Db.

As a result, when the mode selection or change-over switch 20 is moved to the position M to release the plate spring 22 from the grooves 6a, and then the manual operation ring 10 is rotated, the stator or stationary member 6 is rotated about the optical axis on the outer periphery of the center small diameter portion 1c via the intermediate ring 7 and the rollers 25.

The ratio of the angle of rotation of the stationary member 6 to the angle of rotation of the intermediate ring 7, that is, the ratio Rr of the angle of rotation of the cam ring 4 to the angle of rotation of the manual operation ring 10 is given by the following formula (1) in accordance with the principle of the planetary gear device:

$$Rr=(Db \cdot Dc)/(Da \cdot Db'+Db \cdot Dc), \qquad (1)$$

where Da represents diameter of a portion of the fixed barrel 1 with which the roller 25 is in contact, and Dc represents diameter of a portion of the intermediate ring 7 with which the roller 25 is in contact.

As seen in the formula (1), if Da=Dc, it is possible to determine arbitrarily the rotation ratio Rr by changing the ratio between Db and Db'.

Even in the case where Da is not equal to Dc, it is also possible to determine the rotation ratio Rr arbitrarily by all parameters from Da to Dc. Accordingly, according to the present embodiment, angle necessary for the manual operation portion to rotate from an infinite (∞) photographing distance to a short distance is so determined to be a sufficient amount to effect fine manual focus adjustment.

In the present embodiment, after the cam ring 4 has been rotated a predetermined angle and stopped by rotation limit, if the manual operation ring 10 is rotated further, the manual operation ring 10 and the intermediate ring 7 slip along their surfaces of contact with the biasing member 27, whereby no excessive torque is applied to the intermediate ring 7 and components thereover.

Accordingly, the internal components are not inadvertently damaged.

The present invention is not limited to the above-described embodiment, but can assume various modifications or changes within the scope of the present invention.

In the above-described embodiment, each roller rotatably held on the rotary shaft 26 having the center line perpendicular to the optical axis and provided at the outer periphery of the stator or stationary member 6 is comprised of the inner metal ring whose outer periphery is covered by rubber.

In an alternative embodiment, the rollers 25 may be fabricated of metal, synthetic resin or rubber, or a combination of two of these substances. In addition, small stepped gears may be substituted for the rollers 25. In such a case, ring-shaped gears to engage with these small gears may be provided on the right side of the intermediate ring 7 and on the outer diameter portion 1d of the fixed barrel 1. In this case, these gears are biased or urged by the biasing member 27, so backlash may be removed.

In the above-described embodiment, after the cam ring 4 is rotated the predetermined angle and stops by the rotation limit, if the manual operation ring 10 is rotated further, the manual operation ring 10 and the intermediate member 7 slip along the surfaces of contact with the biasing member 27, and therefore no excessive torque is applied to the intermediate ring 7 and components thereover, as described above. In an alternative embodiment, the manual operation ring 10 and the intermediate ring 7 may be integrally formed to be urged as a single member by a biasing member (not shown) interposed between the right large diameter portion 1e of the fixed member 1 and the operation ring 10, so that slip may be caused at the surface of contact with the rollers 25.

In the above-described embodiment, a predetermined frictional torque for preventing rotation of the stationary member 6 at the time when the automatic focus mode is selected is applied by the biasing member 11 urging the stationary member 6 to the inner side surface of the large diameter portion 1d of the fixed lens barrel 1. However, since the stationary member 6 is pressed by the biasing member 27 also through the intermediate ring 7 and the rollers 25. If balancing of fictional torque of those components is selected properly, the biasing member 11 may be omitted.

As described, according to the present invention, it is possible to provide a lens barrel with a built-in ultrasonic motor in which an angle required for rotating a manual operation portion from an infinite (∞) photographing distance position to a short distance position, can be arbitrarily determined, independently from the angle of rotation of a moving member or rotor of the ultrasonic motor as well as from the specification of the lens barrel, whereby the lens barrel with the built-in ultrasonic motor has a superior operability of manual focus adjustment.

What is claimed is:

1. A lens barrel with a built-in ultrasonic motor, comprising:

a photographing optical system;

a fixed barrel;

an ultrasonic motor including a stationary member which is provided on said fixed barrel rotatable about an optical axis and which can generate ultrasonic wave and a moving member which is in frictional contact with said stationary member and is rotatable about the optical axis by said ultrasonic wave to drive said photographing optical system;

a manual operation member for driving said photographing optical system by external operation;

a mode selection member by which an automatic focus adjusting mode and a manual focus adjustment mode is selectable, wherein when said manual focus adjustment mode is selected by said mode selection member the moving member and the stationary member of said ultrasonic motor are united as one body to rotate together in coordination with the manual operation of said manual operation member, thereby driving said photographing optical system, and when said automatic focus adjustment mode is selected by said mode selection member said stationary member of said ultrasonic motor is fixed to said fixed barrel and the moving member is rotated by the ultrasonic wave generated by the stationary member to drive said photographing optical system; and a rotation angle conversion device which converts, at an arbitrary ratio, a rotation angle of said manual operation member to a rotation angle of the stationary member of said ultrasonic motor, wherein said rotation angle conversion device comprises a plurality of small rotors each having two portions whose diameters are different from each other and each being rotatably provided on the stationary member of said ultrasonic motor, and a biasing member which urges said small rotors to said manual operation member and said fixed barrel to be brought into frictional contact therewith, each of said small rotors being in contact with said fixed barrel at one of said two portions whose diameters are different from each other and in contact with said manual operation member at the other of said two portions, whereby said rotors are rotated between said manual operation member and said fixed barrel and the rotation angle of said manual operation member is converted to the rotation angle of said stationary member at the arbitrary ratio.

2. The lens barrel with a built-in ultrasonic motor in accordance with claim 1, wherein each of said small rotors is a roller which has a rotation axis perpendicular to the optical axis of said photographing optical system and whose diameters are different in the direction of the rotation axis.

3. The lens barrel with a built-in ultrasonic motor in accordance with claim 1, wherein said manual operation member includes a manual operating ring provided at said fixed barrel externally manually operably and rotatably about the optical axis, an intermediate ring provided between the manual operating ring and said small rotors rotatably about the optical axis and wherein the biasing member brings said small rotors into frictional contact with said intermediate ring and said fixed barrel.

4. The lens barrel with a built-in ultrasonic motor in accordance with claims 3, wherein each of said small rotors has a small diameter peripheral portion which is in contact with a peripheral surface of the intermediate ring and a large diameter peripheral portion which is in contact with an inner side surface of said fixed barrel.

5. The lens barrel with a built-in ultrasonic motor in accordance with claim 1, wherein said mode selection member is provided on said fixed barrel slidably in the direction of the optical axis and engaging said stationary member to fix the same when said manual focus adjustment mode is selected.

6. A lens barrel with a built-in ultrasonic motor, comprising:

a photographing optical system having a lens which is movable in the direction of an optical axis;

a fixed barrel which supports said photographing optical system;

a manual operation member which is held on the fixed barrel and rotatable by external operation;

an ultrasonic motor including a stationary member which is provided on said fixed barrel and is rotatable about the optical axis and which can generate an ultrasonic wave and a rotor which is in frictional contact with said stationary member and is rotatable about the optical axis;

a mode selection member by which an automatic focus adjustment mode and a manual focus adjustment mode is selectable, when said automatic focus adjustment mode is selected by said mode selection member said stationary member of said ultrasonic motor is fixed to said fixed barrel and the rotor is rotated by the ultrasonic wave generated by the stationary member, and when said manual focus adjustment mode is selected by said mode selection member said stationary member is released so that the rotor and the stationary member is united as one body to rotate together in coordination with the manual operation of said manual operation member, a cam member for moving said lens in the direction of the optical axis by rotation of said rotor; and a rotation transmitting device which, when said mode selection member selects the manual focus adjustment mode, transmits the rotation of the manual operation member to said stationary member of said ultrasonic motor to rotate the stationary member and said rotor together, said rotation transmitting device including a rotation angle conversion device which converts a rotation angle of said manual operation member to a rotation angle of the stationary member of said ultrasonic motor at an arbitrary ratio, wherein said rotation angle conversion device comprises a plurality of small rotors each having two portions whose diameters are different from each other and each being rotatably provided on the stationary member of said ultrasonic motor, and a biasing member which urges said small rotors to said manual operation member and said fixed barrel to be brought into frictional contact therewith, and wherein each of said small rotors is in contact with said fixed barrel at one of said two portions and in contact with said manual operation member at the other of said two portions, whereby said rotors are rotated between said manual operation member and said fixed barrel so that the rotation angle of said manual operation member is converted to the rotation angle of said stationary member at the arbitrary ratio.

7. The lens barrel with a built-in ultrasonic motor in accordance with claim 6, wherein said photographing optical system has a lens holding barrel which holds a lens; and said cam member includes a cam ring held on the said fixed barrel rotatably about the optical axis, the cam ring being formed with a cam groove which guides a pin fixed to said lens holding barrel.

* * * * *